(12) United States Patent
Shintani

(10) Patent No.: US 12,224,406 B2
(45) Date of Patent: Feb. 11, 2025

(54) SECONDARY BATTERY AND METHOD FOR MANUFACTURING SECONDARY BATTERY

(71) Applicant: Prime Planet Energy & Solutions, Inc., Tokyo (JP)

(72) Inventor: Kodai Shintani, Toyota (JP)

(73) Assignee: PRIME PLANET ENERGY & SOLUTIONS, INC., Tokyo (JP)

(*) Notice: Subject to any disclaimer, the term of this patent is extended or adjusted under 35 U.S.C. 154(b) by 0 days.

(21) Appl. No.: 18/421,994

(22) Filed: Jan. 25, 2024

(65) Prior Publication Data

US 2024/0162500 A1  May 16, 2024

Related U.S. Application Data

(62) Division of application No. 17/471,389, filed on Sep. 10, 2021, now Pat. No. 11,923,512.

(30) Foreign Application Priority Data

Sep. 17, 2020  (JP) ................................. 2020-156476

(51) Int. Cl.
*H01M 10/0587* (2010.01)
*H01M 10/04* (2006.01)
(Continued)

(52) U.S. Cl.
CPC ... *H01M 10/0587* (2013.01); *H01M 10/0431* (2013.01); *H01M 10/0525* (2013.01); *H01M 50/103* (2021.01)

(58) Field of Classification Search
None
See application file for complete search history.

(56) References Cited

U.S. PATENT DOCUMENTS

| 2006/0111625 A1* | 5/2006 | Yamauchi | H01M 10/0587 600/372 |
| 2009/0123832 A1 | 5/2009 | Chigiri | |
| 2016/0254569 A1 | 9/2016 | Yagi et al. | |

FOREIGN PATENT DOCUMENTS

| CN | 109818080 A | 5/2019 |
| CN | 111193075 A | 5/2020 |

(Continued)

OTHER PUBLICATIONS

English language machine translation of CN-111193075-A. (Year: 2023).

*Primary Examiner* — Eli S Mekhlin
(74) *Attorney, Agent, or Firm* — HAUPTMAN HAM, LLP

(57) ABSTRACT

In a secondary batter, dead spaces between a wound electrode body and the inner peripheral surfaces of a rectangular battery case are made small. The secondary battery includes a wound electrode body in which a positive electrode sheet, a negative electrode sheet, and a separator interposed between the positive electrode sheet and the negative electrode sheet are superimposed and wound around a winding axis, and a rectangular battery case that houses the wound electrode body. The wound electrode body has a first flat surface, a second flat surface, a third flat surface, and a fourth flat surface positioned on the outer peripheral surfaces around the winding axis. The first flat surface and the second flat surface face each other with the winding axis interposed therebetween. The third flat surface and the fourth flat surface face each other with the winding axis interposed therebetween.

2 Claims, 7 Drawing Sheets

(51) Int. Cl.
*H01M 10/0525* (2010.01)
*H01M 50/103* (2021.01)

(56) References Cited

FOREIGN PATENT DOCUMENTS

| | | |
|---|---|---|
| JP | H06-188024 A | 7/1994 |
| JP | H07-085885 A | 3/1995 |
| JP | H11-097055 A | 4/1999 |
| JP | 2003-100339 A | 4/2003 |
| JP | 2005-122940 A | 5/2005 |
| JP | 2008-177338 A | 7/2008 |
| JP | 2011-014238 A | 1/2011 |
| JP | 2017-120729 A | 7/2017 |
| JP | 2018-055893 A | 4/2018 |
| WO | 2015/075766 A1 | 5/2015 |

\* cited by examiner

SECONDARY BATTERY AND METHOD FOR MANUFACTURING SECONDARY BATTERY

CROSS REFERENCE TO RELATED APPLICATIONS

This application is a divisional of U.S. patent application Ser. No. 17/471,389, filed Sep. 10, 2021, which claims priority to Japanese Patent Application No. 2020-156476 filed on Sep. 17, 2020, the disclosures of which applications are hereby incorporated by reference herein in their entirety.

The present invention relates to a secondary battery and a method for manufacturing a secondary battery.

BACKGROUND

For example, Japanese Patent Application Publication No. 2017-120729 discloses a secondary battery including a rectangular battery case and a flat wound electrode body housed in the battery case. In such the flat wound electrode body, a positive electrode sheet, a negative electrode sheet, and a separator interposed between the positive electrode sheet and the negative electrode sheet are superimposed and wound into a flat shape.

The flat wound electrode body includes two rounded parts disposed at both ends of one direction orthogonal to a winding axis direction and flat surface parts sandwiched by the two rounded parts. When seen from the winding axis direction, the outer peripheral shape of the flat wound electrode body is configured of two rounded parts and flat surface parts. Flat wound electrode bodies having such a configuration are disclosed, for example, in Japanese Patent Application Publication Nos. 2018-55893, H11-97055, or the like.

When the flat wound electrode body as described above is housed in the rectangular battery case, voids are formed between two rounded parts of the flat wound electrode body and the inner peripheral surfaces of the battery case. The size of the voids is preferably smaller because the voids can form dead spaces.

SUMMARY

A secondary battery proposed herein includes a wound electrode body and a battery case. In the wound electrode body, an elongated positive electrode sheet, an elongated negative electrode sheet, and a separator interposed between the positive electrode sheet and the negative electrode sheet are superimposed and wound around a winding axis. The battery case is a rectangular battery case that houses the wound electrode body. The wound electrode body has a first flat surface, a second flat surface, a third flat surface, and a fourth flat surface positioned on the outer peripheral surfaces around the winding axis. The first flat surface and the second flat surface face each other with the winding axis interposed therebetween. The third flat surface and the fourth flat surface are disposed between the first flat surface and the second flat surface and face each other with the winding axis interposed therebetween.

According to the secondary battery proposed herein, dead spaces between the battery case and the wound electrode body can be made smaller than conventional batteries by arranging the first flat surface, the second flat surface, the third flat surface, and the fourth flat surface along the inner peripheral surfaces of the rectangular battery case. Thus, the volume efficiency of the wound electrode body can be enhanced.

In the secondary battery proposed herein, the wound electrode body may have a first rounded part disposed between the first flat surface and the third flat surface, a second rounded part disposed between the first flat surface and the fourth flat surface, a third rounded part disposed between the second flat surface and the third flat surface, and a fourth rounded part disposed between the second flat surface and the fourth flat surface.

In the secondary battery proposed herein, inner voids may be formed at gaps in a portion, where the positive electrode sheet, the negative electrode sheet, and the separator are superimposed, inside each of the first rounded part, the second rounded part, the third rounded part, and the fourth rounded part.

In the secondary battery proposed herein, the separator may include a first separator and a second separator. The wound electrode body may be wound in a state where the positive electrode sheet, the first separator, the negative electrode sheet, and the second separator are superimposed in this order. In this case, inner voids may be formed between the positive electrode sheet and the first separator, between the first separator and the negative electrode sheet, between the negative electrode sheet and the second separator, and between the second separator and the positive electrode sheet, inside each of the first rounded part, the second rounded part, the third rounded part, and the fourth rounded part.

In the secondary battery proposed herein, at least the first flat surface and the third flat surface may be in contact with the inner peripheral surfaces of the battery. In this case, an exterior void may be formed between the first rounded part and an inner peripheral surface of the battery case. One or a plurality of the inner voids may be formed inside the first rounded part. The exterior void may be larger than one of the inner voids.

In the secondary battery proposed herein, the battery case may have a first case flat surface facing the first flat surface along the first flat surface, a second case flat surface facing the second flat surface along the second flat surface and facing the first case flat surface with the wound electrode body interposed therebetween, a third case flat surface facing the third flat surface along the third flat surface, and a fourth case flat surface facing the fourth flat surface along the fourth flat surface and facing the third case flat surface with the wound electrode body interposed therebetween.

A method for manufacturing a secondary battery proposed herein includes a winding step and a pressing step. When mutually intersecting three directions are assumed to be a first direction, a second direction, and a third direction, respectively, in the winding step, a positive electrode sheet, a negative electrode sheet, and a separator are superimposed and wound around a winding axis extending in the first direction, to prepare a wound electrode body. In the pressing step, the wound electrode body is pressed in the second direction and also in the third direction to flatten the wound electrode body, to thereby form a first flat surface and a second flat surface facing each other with the winding axis interposed therebetween and a third flat surface and a fourth flat surface disposed between the first flat surface and the second flat surface and facing each other with the winding axis interposed therebetween, on outer peripheral surfaces of the wound electrode body.

According to the method for manufacturing a secondary battery proposed herein, two flat surfaces facing each other in the second direction (for example, the first flat surface and the second flat surface) can be formed in a wound electrode body by pressing the wound electrode body in the second direction in the pressing step. Furthermore, two flat surfaces facing each other in the third direction (for example, the third flat surface and the fourth flat surface) can be formed in a wound electrode body by pressing the wound electrode body in the third direction.

The method for manufacturing a secondary battery proposed herein may further include, after the winding step, an arranging step of arranging a first position fixed body having a first fixed surface that is contactable with the wound electrode body, a second position fixed body having a second fixed surface that is contactable with the wound electrode body, and the wound electrode body along the third direction in a state where the first position fixed body and the second position fixed body are arranged such that the first fixed surface and the second fixed surface face each other with the wound electrode body interposed therebetween. In this case, in the pressing step, after the arranging step, the wound electrode body may be pressed in the second direction until the wound electrode body is pressed against the first fixed surface and the second fixed surface.

DETAILED DESCRIPTION

Figure 1:
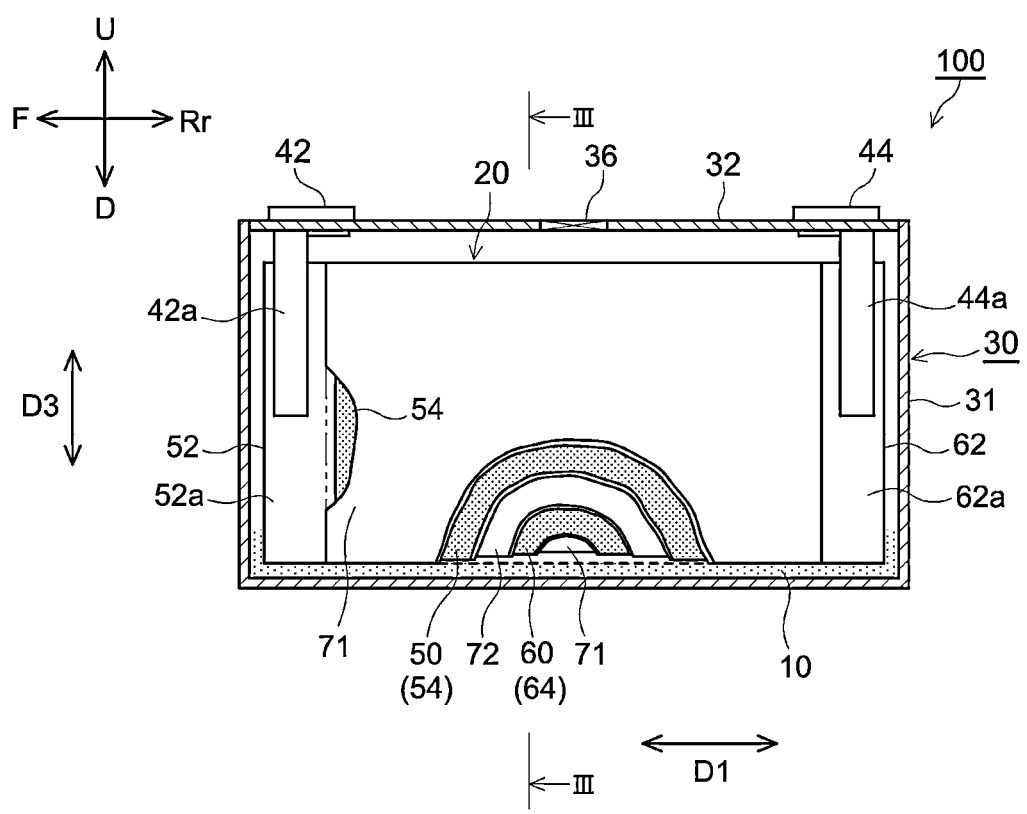
FIG. 1 is a sectional view schematically illustrating the inner structure of a secondary battery according to an embodiment seen from the second direction.

Hereinafter, one embodiment of the secondary battery disclosed herein is described with reference to the drawings. Matters other than those specifically mentioned in the present description but necessary for implementation may be recognized as design matters for a person skilled in the art based on conventional techniques in the art. The present invention can be implemented based on the content disclosed in the present description and a common general technical knowledge in the art. In the drawings below, members and parts exhibiting the same effect are assigned with the same numerals or symbols.

The term "battery" used herein refers to a power storage device in general from which electrical energy can be taken out and is a concept including a primary battery and a secondary battery. The term "secondary battery" refers to a power storage device in general that can be charged and discharged repeatedly and includes a so-called storage battery such as a lithium secondary battery, a nickel-hydrogen battery, and a nickel-cadmium battery. Hereinafter, the secondary battery disclosed herein will be described in detail while illustrating a lithium-ion secondary battery, one of the secondary batteries. However, the secondary battery disclosed herein is not limited to the embodiments described herein.

Figure 3:
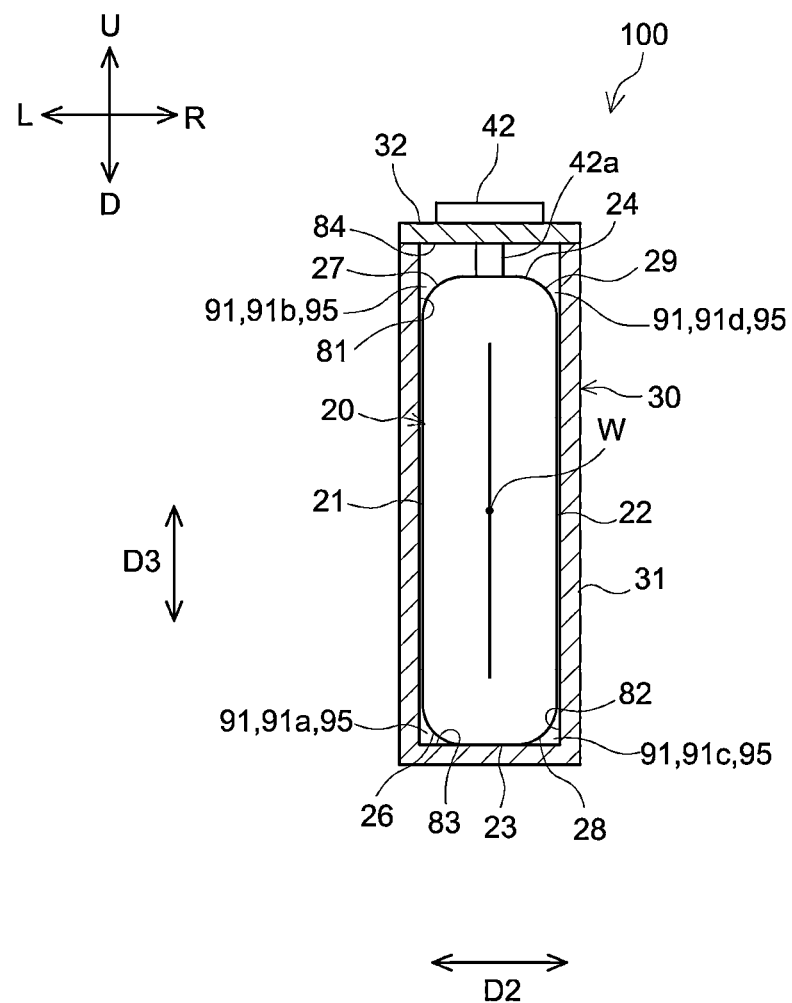
FIG. 3 is a sectional view schematically illustrating a battery case and the wound electrode body of the secondary battery and the wound electrode body according to the embodiment and is a sectional view of the secondary battery in a cross section of FIG. 1.
Figure 4:
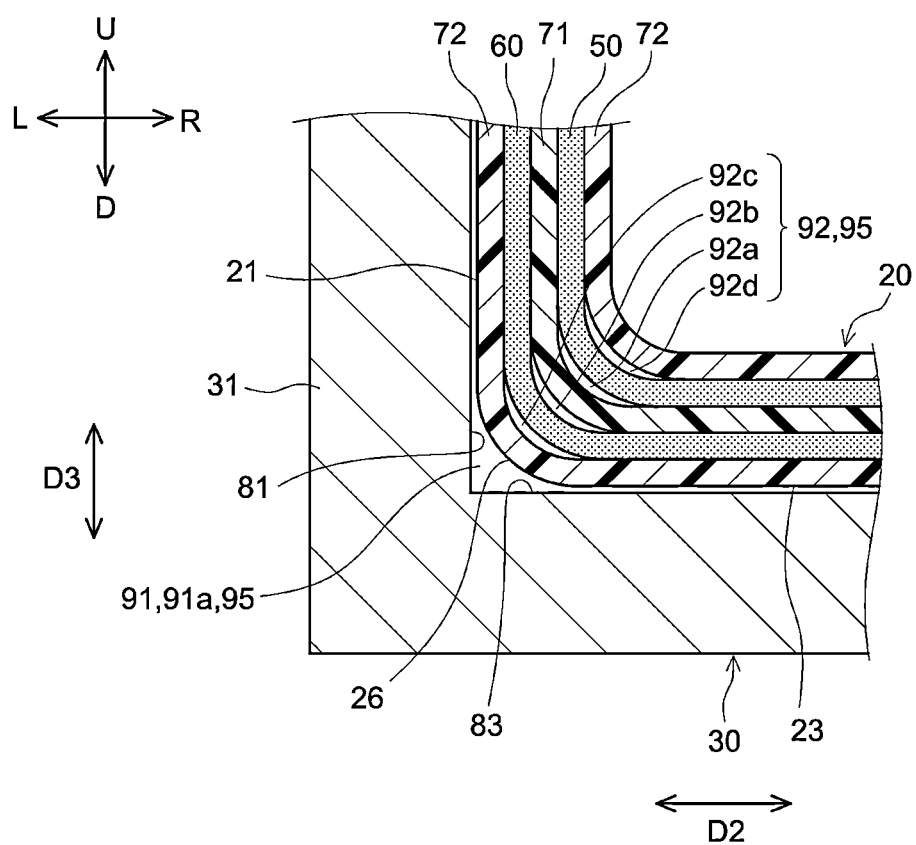
FIG. 4 is a sectional view schematically illustrating a portion around the first rounded part of the wound electrode body.

FIG. 1 is a sectional view schematically illustrating the inner structure of a secondary battery 100 according to the present embodiment. In the present embodiment, the secondary battery 100 is placed in a three-dimensional space indicated by a first direction D1, a second direction D2, and a third direction D3 intersecting (orthogonal to, in this embodiment) one another. The symbols "F", "Rr", "L", "R", "U", and "D" in the drawings represent "front", "rear", "left", "right", "up", and "down", respectively. In FIGS. 1, 3, and 4, the first direction D1 indicates a front-rear direction, the second direction D2 indicates a left-right direction, and the third direction D3 indicates a up-down direction. The first direction D1 is also a direction in which a winding axis W (see FIG. 2) extends.

As illustrated in FIG. 1, the secondary battery 100 according to the present embodiment is a sealed lithium-ion secondary battery provided with a battery case 30, a wound electrode body 20, and a non-aqueous electrolyte 10.

The battery case 30 houses the wound electrode body 20 and the non-aqueous electrolyte 10 thereinside in a sealed manner. In the present embodiment, the battery case 30 has a rectangular parallelepiped and flat rectangular shape. The battery case 30 includes a main body 31 and a lid 32. The main body 31 is a rectangular hollow member having an opening (not illustrated) at one end (for example, the upper end). The lid 32 has a plate shape and seals the opening of the main body 31. The lid 32 is attached to the main body 31.

The lid 32 is provided with a positive electrode terminal 42 and a negative electrode terminal 44 for external connection and a safety valve 36. The safety valve 36 releases an inner pressure of the battery case 30 when the inner pressure increases to a predetermined pressure or higher. The battery case 30 is provided with an inlet port (not illustrated) for injecting the non-aqueous electrolyte 10 into the main body 31. The material of the battery case 30 is not particularly limited, but, for example, a metallic material which is light and has high thermal conductivity, such as aluminum, may be used as the material of the battery case 30.

Figure 2:
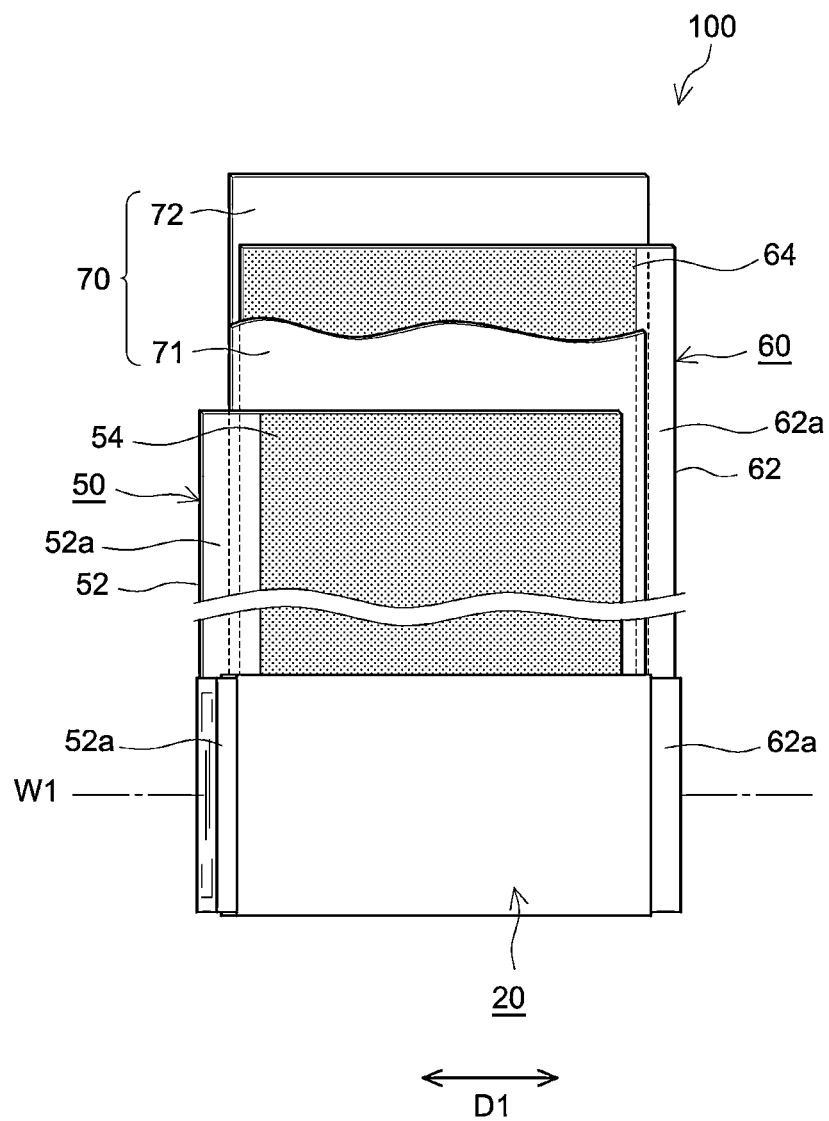
FIG. 2 is a schematic view as a partial developed view illustrating a constitution of a wound electrode body of the secondary battery according to the embodiment.

FIG. 2 is a schematic view illustrating a constitution of the wound electrode body 20 of the secondary battery 100 according to the present embodiment. As illustrated in FIG. 2, the wound electrode body 20 includes an elongated positive electrode sheet 50, an elongated negative electrode sheet 60, and an elongated separator 70. The separator 70 is interposed between the positive electrode sheet 50 and the negative electrode sheet 60. In the present embodiment, the separator 70 includes a first separator 71 and a second separator 72 and is constituted of two separators. In the wound electrode body 20, the positive electrode sheet 50, the negative electrode sheet 60, and the separator 70 are superimposed and wound around the winding axis W. In the present embodiment, the positive electrode sheet 50, the first separator 71, the negative electrode sheet 60, and the second separator 72 are superimposed in this order so that the directions thereof are aligned in the longitudinal direction of the developed positive electrode sheet 50, and wound around the winding axis W.

In the positive electrode sheet 50, elongated positive electrode active material layers 54 containing a positive electrode active material are formed on one surface or both surfaces (both surfaces in the present embodiment) of a sheet-shaped positive electrode current collector 52 along the longitudinal direction thereof. An unformed part 52a in which the positive electrode active material layer 54 is not formed is disposed at an end on one end side (left end side in FIG. 2) in a direction (the first direction D1 in this embodiment) in which the winding axis W in the positive electrode current collector 52 extends. The first direction D1 is a direction along a short direction of the positive electrode sheet 50 in a developed state. The unformed part 52a of the positive electrode sheet 50 is a part in which the positive electrode current collector 52 is exposed. As illustrated in FIG. 1, a positive electrode collector plate 42a is joined to the unformed part 52a of the positive electrode sheet 50. A positive electrode terminal 42 is electrically connected to the positive electrode collector plate 42a.

In the present embodiment, a positive electrode current collector for secondary batteries of this kind can be used as the positive electrode current collector 52 without any particular limitation. As the positive electrode current collector 52, a metallic positive electrode current collector having good conductivity may preferably be used. Metallic materials such as aluminum, nickel, titanium, and stainless steel can be adopted as the positive electrode current collector 52. In particular, aluminum (for example, aluminum foils) is preferably used as the positive electrode current collector 52.

Examples of the positive electrode active material contained in the positive electrode active material layer 54 include lithium composite metal oxides having, for example, layered structures, spinel structures, or the like (for example, $LiNi_{1/3}Co_{1/3}Mn_{1/3}O_2$, $LiNiO_2$, $LiCoO_2$, $LiFeO_2$, $LiMn_2O_4$, $LiNi_{0.5}Mn_{1.5}O_4$, $LiCrMnO_4$, $LiFePO_4$ or the like). The positive electrode active material layer 54 may be formed by dispersing the positive electrode active material and an optional material (for example, a conductive material, a binder, or the like) in a suitable solvent (for example, N-methyl-2-pyrrolidone: NMP), preparing a paste (or slurry) composition, adding a suitable amount of the composition on a surface of the positive electrode current collector 52, and drying the composition.

As illustrated in FIG. 2, in the negative electrode sheet 60, elongated negative electrode active material layers 64 containing a negative electrode active material are formed on one surface or both surfaces (both surfaces in the present embodiment) of a sheet-shaped negative electrode current collector 62 along the longitudinal direction thereof. An unformed part 62a in which the negative electrode active material layer 64 is not formed is disposed at an end on the other end side (right end side in FIG. 2) in a direction in which the winding axis W in the negative electrode current collector 62 extends. The unformed part 62a of the negative electrode sheet 60 is a part in which the negative electrode current collector 62 is exposed. As illustrated in FIG. 1, a negative electrode collector plate 44a is joined to the unformed part 62a of the negative electrode sheet 60. A negative electrode terminal 44 is electrically connected to the negative electrode collector plate 44a.

In the present embodiment, a negative electrode current collector for secondary batteries of this kind can be used as the negative electrode current collector 62 without any particular limitation. As the negative electrode current collector 62, a metallic negative electrode current collector having good conductivity may preferably be used. For example, copper (such as copper foils) or an alloy mainly composed of copper may be used as the negative electrode current collector 62.

Examples of the negative electrode active material contained in the negative electrode active material layer 64 include particulate (or spherical, scaly) carbon materials at least partially including a graphite structure (for example, a layered structure), lithium-transition metal composite oxides (for example, a lithium-titanium composite oxide such as $Li_4Ti_5O_{12}$), lithium-transition metal composite nitrides, or the like. The negative electrode active material layer 64 may be formed by dispersing the negative electrode active material and an optional material (for example, a binder or the like) in a suitable solvent (for example, ion-exchange water), preparing a paste (or slurry) composition, adding a suitable amount of the composition on a surface of the negative electrode current collector 62, and drying the composition.

As illustrated in FIG. 2, a separator made of a conventionally-known porous sheet can be used without any particular limitation as the separator 70 (specifically, the first separator 71 and the second separator 72). As the separator 70, for example, porous sheets (for example, films, non-woven fabrics, or the like) made of a resin such as polyethylene (PE), polypropylene (PP), polyesters, celluloses, and polyamides can be mentioned. Such porous sheets may have a single-layer structure or may have a multilayer structure including two or more layers (for example, a three-layer structure in which PP layers are laminated on both surfaces of a PE layer). A structure provided with porous heat-resistant layers on one surface or both surfaces of a porous sheet may be acceptable. These heat-resistant layers can be, for example, layers including an inorganic filler and a binder (for example, a filler layer). As the inorganic filler, for example, alumina, boehmite, silica, or the like can be preferably adopted.

As illustrated in FIG. 1, the non-aqueous electrolyte 10 housed, together with the wound electrode body 20, in the battery case 30 contains a supporting electrolyte in a suitable non-aqueous solvent, and conventionally-known non-aqueous electrolytes may be adopted without any particular limitation. Examples of the non-aqueous solvent which may be used include ethylene carbonate (EC), diethyl carbonate (DEC), dimethyl carbonate (DMC), ethyl methyl carbonate (EMC), or the like. Examples of the supporting electrolyte that may be suitably used include lithium salts (for example, LiBOB, $LiPF_6$, or the like). In the present embodiment, LiBOB is adopted as the supporting electrolyte. In this case, the LiBOB content in the non-aqueous electrolyte 10 is preferably 0.3 wt % to 0.6 wt %.

Next, the shapes of the wound electrode body 20 and the battery case 30 according to the present embodiment will be described in detail. FIG. 3 is a sectional view schematically illustrating the secondary battery 100 and is a sectional view of the secondary battery 100 in a cross section of FIG. 1. FIG. 3 shows the outer peripheral shape of the wound electrode body 20 and a state where the wound electrode body 20 is wound is omitted. As illustrated in FIG. 3, the outer peripheral shape of the wound electrode body 20 according to the present embodiment is a rounded rectangle when seen from a direction of the winding axis W (the first direction D1 in this embodiment). In the present embodiment, the outer peripheral shape of the central part in the first direction D1 of the wound electrode body 20 is a rounded rectangle. The central part in the first direction D1 of the wound electrode body 20 herein means, for example, a central piece when the wound electrode body 20 is divided into three pieces in the first direction D1. The following description relating to the wound electrode body 20 basically describes the entire structure of the wound electrode body 20. However, if the description does not specifically mention or describe a specific part of the wound electrode body 20, at least the central part in the first direction D1 of the wound electrode body 20 shall be described.

The wound electrode body 20 has a first flat surface 21, a second flat surface 22, a third flat surface 23, and a fourth flat surface 24. The first flat surface 21 to the fourth flat surface 24 each constitute a part of the outer peripheral surfaces around the winding axis W of the wound electrode body 20 and are positioned on the outer peripheral surfaces around the winding axis W. In the present embodiment, the first flat surface 21 constitutes a surface at one end side in the second direction D2 in the outer peripheral surfaces of the wound electrode body 20, namely, a left surface in this embodiment. The first flat surface 21 is a flat surface spread in the first direction D1 (in other words, a direction in which the winding axis W extends) and the third direction D3. The first flat surface 21 is a flat surface that is longer in the first direction D1 than in the third direction D3.

The second flat surface 22 is disposed at a position facing the first flat surface 21 with the winding axis W of the wound electrode body 20 interposed therebetween. In the present embodiment, the second flat surface 22 constitutes a surface on the other end side in the second direction D2 in the outer peripheral surfaces of the wound electrode body 20, namely, a right surface in this embodiment. The second flat surface 22 is a flat surface spread in the first direction D1 and the third direction D3. The second flat surface 22 is a flat surface that is longer in the first direction D1 than in the third direction D3 as with the first flat surface 21. The second flat surface 22 is disposed on the right side from the first flat surface 21 and arranged side-by-side with the first flat surface 21 in the second direction D2. Namely, the first flat surface 21 overlaps the second flat surface 22 when seen from the second direction D2. The first flat surface 21 and the second flat surface 22 are in parallel with each other but may be slightly inclined from a parallel arrangement.

In the present embodiment, the first flat surface 21 has the same size as the second flat surface 22. However, the first flat surface 21 may be larger or may be smaller than the second flat surface 22. In the present embodiment, the length of the first flat surface 21 in the first direction D1 is the same as the length of the second flat surface 22 in the first direction D1. However, the length of the first flat surface 21 in the first direction D1 may be longer or may be shorter than the length of the second flat surface 22 in the first direction D1. Similarly, the length of the first flat surface 21 in the third direction D3 is the same as the length of the second flat surface 22 in the third direction D3 but may be longer or may be shorter than the length of the second flat surface 22 in the third direction D3.

The third flat surface 23 is disposed between the first flat surface 21 and the second flat surface 22. The third flat surface 23 constitutes a surface at one end side in the third direction D3 in the outer peripheral surfaces of the wound electrode body 20, namely, a lower surface in this embodiment. In the present embodiment, the third flat surface 23 is disposed below the first flat surface 21 and the second flat surface 22. The third flat surface 23 is a flat surface spread in the first direction D1 and the second direction D2 and is orthogonal to the first flat surface 21 and the second flat surface 22. The third flat surface 23 is a flat surface that is longer in the first direction D1 than in the second direction D2.

The fourth flat surface 24 is disposed at a position facing the third flat surface 23 with the winding axis W of the wound electrode body 20 interposed therebetween. The fourth flat surface 24 is disposed between the first flat surface 21 and the second flat surface 22. In the present embodiment, the fourth flat surface 24 constitutes a surface on the other end side in the third direction D3 in the outer peripheral surfaces of the wound electrode body 20, namely, an upper surface in this embodiment. The fourth flat surface 24 is disposed above the first flat surface 21 and the second flat surface 22. The fourth flat surface 24 is a flat surface spread in the first direction D1 and the second direction D2 and is orthogonal to the first flat surface 21 and the second flat surface 22 as with the third flat surface 23. The fourth flat surface 24 is a flat surface that is longer in the first direction D1 than in the second direction D2.

In the present embodiment, the fourth flat surface 24 is disposed above the third flat surface 23 and arranged side-by-side with the third flat surface 23 in the third direction D3. The third flat surface 23 overlaps the fourth flat surface 24 when seen from the third direction D3. The third flat surface 23 and the fourth flat surface 24 are in parallel with each other but may be slightly inclined from a parallel arrangement. In the present embodiment, the third flat surface 23 has the same size as the fourth flat surface 24. However, the third flat surface 23 may be larger or may be smaller than the fourth flat surface 24. In the present embodiment, the length of the third flat surface 23 in the first direction D1 is the same as the length of the fourth flat surface 24 in the first direction D1 but may be longer or may be shorter than the length of the fourth flat surface 24 in the first direction D1. Similarly, the length of the third flat surface 23 in the second direction D2 is the same as the length of the fourth flat surface 24 in the second direction D2 but may be longer or may be shorter than the length of the fourth flat surface 24 in the second direction D2.

In the present embodiment, the third flat surface 23 and the fourth flat surface 24 each may be smaller or larger than either of the first flat surface 21 and the second flat surface 22. The third flat surface 23 and the fourth flat surface 24 each may have the same size as either of the first flat surface 21 and the second flat surface 22. In the present embodiment, the length of each of the third flat surface 23 and the fourth flat surface 24 in the second direction D2 are shorter than the length of each of the first flat surface 21 and the second flat surface 22 in the third direction D3. However, the length of each of the third flat surface 23 and the fourth flat surface 24 in the second direction D2 may be the same as the length of each of the first flat surface 21 and the second flat surface 22 in the third direction D3 or may be longer than the length of each of the first flat surface 21 and the second flat surface 22 in the third direction D3. The length of each of the third flat surface 23 and the fourth flat surface 24 in the first direction D1 are the same as the length of each of the first flat surface 21 and the second flat surface 22 in the first direction D1. However, the length of each of the third flat surface 23 and the fourth flat surface 24 in the first direction D1 may be longer or may be shorter than the length of each of the first flat surface 21 and the second flat surface 22 in the first direction D1.

In the present embodiment, the wound electrode body 20 further includes a first rounded part 26, a second rounded part 27, a third rounded part 28, and a fourth rounded part 29, as illustrated in FIG. 3. The first rounded part 26 to the fourth rounded part 29 respectively constitute rounded parts in the outer peripheral surfaces of the wound electrode body 20. In this embodiment, the first rounded part 26 to the fourth rounded part 29 are respectively disposed on four corners of the wound electrode body 20 when seen from the direction in which the winding axis W extends (the first direction D1 in this case).

The first rounded part 26 is disposed between the first flat surface 21 and the third flat surface 23. The first rounded part 26 is continuous with the first flat surface 21 and the third flat surface 23. The first rounded part 26 is on the lower right position from the first flat surface 21 and on the upper left position from the third flat surface 23. The second rounded part 27 is disposed between the first flat surface 21 and the fourth flat surface 24. The second rounded part 27 is continuous with the first flat surface 21 and the fourth flat surface 24. The second rounded part 27 is on the upper right position from the first flat surface 21 and on the lower left position from the fourth flat surface 24. The second rounded part 27 is disposed above the first rounded part 26. The first rounded part 26 and the second rounded part 27 are arranged side-by-side in the third direction D3, and the first rounded part 26 overlaps the second rounded part 27 when seen from the third direction D3.

The third rounded part 28 is disposed between the second flat surface 22 and the third flat surface 23. The third rounded part 28 is continuous with the second flat surface 22 and the third flat surface 23. The third rounded part 28 is on the lower left position from the second flat surface 22 and on the upper right position from the third flat surface 23. The third rounded part 28 is arranged side-by-side with the first rounded part 26 in the second direction D2. The third rounded part 28 overlaps the first rounded part 26 when seen from the second direction D2. The fourth rounded part 29 is disposed between the second flat surface 22 and the fourth flat surface 24. The fourth rounded part 29 is continuous with the second flat surface 22 and the fourth flat surface 24. The fourth rounded part 29 is on the upper left position from the second flat surface 22 and on the lower right position from the fourth flat surface 24. In the present embodiment, the fourth rounded part 29 is arranged side-by-side with the second rounded part 27 in the second direction D2. The fourth rounded part 29 overlaps the second rounded part 27 when seen from the second direction D2. The fourth rounded part 29 is arranged side-by-side with the third rounded part 28 in the third direction D3. The fourth rounded part 29 overlaps the third rounded part 28 when seen from the third direction D3.

In the present embodiment, the first rounded part 26 to the fourth rounded part 29 are the same in size. Namely, the first rounded part 26 to the fourth rounded part 29 are the same in radius of curvature. However, any of the first rounded part 26 to the fourth rounded part 29 may differ in size from another rounded part. Namely, any of the rounded parts of the first rounded part 26 to the fourth rounded part 29 may differ in radius of curvature from another rounded part.

The battery case 30, which houses the non-aqueous electrolyte 10 (see FIG. 1) and the wound electrode body 20, is a rectangular case as described above. Thus, the battery case 30 has a rectangular inner space thereinside. The non-aqueous electrolyte 10 and the wound electrode body 20 are housed in the inner space.

In the present embodiment, the battery case 30 has a first case flat surface 81, a second case flat surface 82, a third case flat surface 83, and a fourth case flat surface 84 as illustrated in FIG. 3. The first case flat surface 81 to the fourth case flat surface 84 constitute the inner peripheral surfaces of the battery case 30. In the present embodiment, the first case flat surface 81 to the third case flat surface 83 constitute the inner peripheral surfaces of the main body 31 of the battery case 30, and the fourth case flat surface 84 constitutes an inner peripheral surface of the lid 32 of the battery case 30.

The first case flat surface 81 constitutes a surface at one end side in the second direction D2 in the inner peripheral surfaces of the battery case 30, namely, a left surface in this embodiment. The first case flat surface 81 faces the first flat surface 21 of the wound electrode body 20 along the first flat surface 21. In this embodiment, the first case flat surface 81 is disposed on the left side from the first flat surface 21. The first case flat surface 81 overlaps the first flat surface 21 when seen from the second direction D2. The first case flat surface 81 is in parallel with the first flat surface 21 but may be slightly inclined relative to the first flat surface 21.

The second case flat surface 82 constitutes a surface on the other end side in the second direction D2 in the inner peripheral surfaces of the battery case 30, namely, a right surface in this embodiment. The second case flat surface 82 is in parallel with the first case flat surface 81 and arranged side-by-side with the first case flat surface 81 in the second direction D2. The second case flat surface 82 overlaps the first case flat surface 81 when seen from the second direction D2. The second case flat surface 82 faces the first case flat surface 81 with the wound electrode body 20 interposed therebetween. The second case flat surface 82 faces the second flat surface 22 of the wound electrode body 20 along the second flat surface 22. In this embodiment, the second case flat surface 82 is positioned on the right side from the second flat surface 22, and the second case flat surface 82 overlaps the second flat surface 22 when seen from the second direction D2. The second case flat surface 82 is in parallel with the second flat surface 22 but may be slightly inclined relative to the second flat surface 22.

The third case flat surface 83 constitutes a surface at one end side in the third direction D3 in the inner peripheral surfaces of the battery case 30, namely, a lower surface in this embodiment. The third case flat surface 83 is disposed between the first case flat surface 81 and the second case flat surface 82. In the present embodiment, the third case flat surface 83 is continuous with the first case flat surface 81 and the second case flat surface 82. Specifically, the left end of the third case flat surface 83 is connected to the lower end of the first case flat surface 81. The right end of the third case flat surface 83 is connected to the lower end of the second case flat surface 82. The third case flat surface 83 faces the third flat surface 23 of the wound electrode body 20 along the third flat surface 23. In this embodiment, the third case flat surface 83 is disposed below the third flat surface 23. The third case flat surface 83 overlaps the third flat surface 23 when seen from the third direction D3. The third case flat surface 83 is in parallel with the third flat surface 23 but may be slightly inclined relative to the third flat surface 23.

The fourth case flat surface 84 constitutes a surface on the other end side in the third direction D3 in the inner peripheral surfaces of the battery case 30, namely, an upper surface in this embodiment. The fourth case flat surface 84 is disposed between the first case flat surface 81 and the second case flat surface 82 as with the third case flat surface 83. The fourth case flat surface 84 is detachably continuous with the first case flat surface 81 and the second case flat surface 82. Specifically, when the lid 32 is attached to the main body 31 of the battery case 30, the left end of the fourth case flat surface 84 is connected to the upper end of the first case flat surface 81 and the right end of the fourth case flat surface 84 is connected to the upper end of the second case flat surface 82. The fourth case flat surface 84 is in parallel with the third case flat surface 83 and arranged side-by-side with the third case flat surface 83 in the third direction D3. The fourth case flat surface 84 overlaps the third case flat surface 83 when seen from the third direction D3. The fourth case flat surface 84 faces the third case flat surface 83 with the wound electrode body 20 interposed therebetween. The fourth case flat surface 84 faces the fourth flat surface 24 of the wound electrode body 20 along the fourth flat surface 24. In this embodiment, the fourth case flat surface 84 is positioned above the fourth flat surface 24. The fourth case flat surface 84 overlaps the fourth flat surface 24 when seen from the third direction D3. The fourth case flat surface 84 is in parallel with the fourth flat surface 24 but may be slightly inclined relative to the fourth flat surface 24.

In the present embodiment, although the illustration is omitted an insulating film is disposed between an inner peripheral surface of the battery case 30 and the wound electrode body 20. This insulating film is formed of, for example, a resin material such as polypropylene (PP) and polyethylene (PE). In a state where the wound electrode body 20 is housed in the battery case 30, at least one of the first flat surface 21, the second flat surface 22, the third flat surface 23, and the fourth flat surface 24 of the wound electrode body 20 is in indirect contact with the inner peripheral surfaces of the battery case 30 via the insulating film. In the present embodiment, the first flat surface 21, the second flat surface 22, and the third flat surface 23 of the wound electrode body 20 are in indirect contact with the inner peripheral surfaces of the battery case 30 via the insulating film, and the fourth flat surface 24 is not in contact with any inner peripheral surface of the battery case 30 and is separated from the inner peripheral surfaces of the battery case 30. Specifically, in a state where the wound electrode body 20 is housed in the battery case 30, the first flat surface 21 is in contact with the first case flat surface 81 via the insulating film, the second flat surface 22 is in contact with the second case flat surface 82 via the insulating film, and the third flat surface 23 is in contact with the third case flat surface 83 via the insulating film. Meanwhile, the fourth flat surface 24 is not in contact with the fourth case flat surface 84 and is separated downward from the fourth case flat surface 84. The fourth flat surface 24 may be in contact with an inner peripheral surface of the battery case 30 via the insulating film.

In the present embodiment, in a state where the wound electrode body 20 is housed in the battery case 30, voids (hereinafter referred to as exterior voids 91) are formed between the wound electrode body 20 and the battery case 30 as illustrated in FIG. 3. The exterior voids 91 are gaps formed between the outer peripheral surfaces of the wound electrode body 20 and the inner peripheral surfaces of the battery case 30. In the present embodiment, the exterior voids 91 include a first exterior void 91a, a second exterior void 91b, a third exterior void 91c, and a fourth exterior void 91d.

The first exterior void 91a is a gap formed between the first rounded part 26 and an inner peripheral surface of the battery case 30. In this embodiment, the first exterior void 91a is a gap surrounded by the first rounded part 26, the first case flat surface 81 of the battery case 30, and the third case flat surface 83. The first exterior void 91a is an example of "an exterior void formed between the first rounded part and an inner peripheral surface of the battery case" of the present invention. The second exterior void 91b is a gap formed between the second rounded part 27 and an inner peripheral surface of the battery case 30. The second exterior void 91b is a gap surrounded by the second rounded part 27, the first case flat surface 81 of the battery case 30, and the fourth case flat surface 84.

The third exterior void 91c is a gap formed between the third rounded part 28 and an inner peripheral surface of the battery case 30. The third exterior void 91c is a gap surrounded by the third rounded part 28, the second case flat surface 82 of the battery case 30, and the third case flat surface 83. In this embodiment, the first exterior void 91a and the third exterior void 91c are the same in size. However, the first exterior void 91a may be larger or may be smaller than the third exterior void 91c.

The fourth exterior void 91d is a gap formed between the fourth rounded part 29 and an inner peripheral surface of the battery case 30. In this embodiment, the fourth exterior void 91d is a gap surrounded by the fourth rounded part 29, the second case flat surface 82 of the battery case 30, and the fourth case flat surface 84. In the present embodiment, the size of the fourth exterior void 91d is the same as that of the second exterior void 91b. However, the fourth exterior void 91d may be larger or may be smaller than the second exterior void 91b. Note that, as in the present embodiment, when the fourth case flat surface 84 and the fourth flat surface 24 are separated from each other, the second exterior void 91b and the fourth exterior void 91d are continuous. In this case, for example, the left side void piece when the continuous void is divided into two equal pieces in the second direction D2 is assumed to be the second exterior void 91b, and the right side void piece is assumed to be the fourth exterior void 91d.

Inside at least one of the first rounded part 26, the second rounded part 27, the third rounded part 28, and the fourth rounded part 29 of the wound electrode body 20, the inner voids 92 as illustrated in FIG. 4 are formed at gaps in a portion where the positive electrode sheet 50, the negative electrode sheet 60, and the separator 70 are superimposed. In the present embodiment, the inner voids 92 are formed at gaps in a portion where the positive electrode sheet 50, the negative electrode sheet 60, and the separator 70 are superimposed inside each of the first rounded part 26, the second rounded part 27, the third rounded part 28, and the fourth rounded part 29. A plurality of inner voids 92 are formed respectively with respect to the rounded parts 26 to 29. FIG. 4 illustrates the inner voids 92 formed inside the first rounded part 26, and the inner voids 92 formed inside the second rounded part 27 to the fourth rounded part 29 each have a similar constitution to the inner voids 92 of the first rounded part 26. Namely, the constitutions of the inner voids 92 are the same among the first rounded part 26 to the fourth rounded part 29 in the present embodiment. Thus, inner voids 92 inside the first rounded part 26 will be described below, and the description about the constitutions of the inner voids 92 each inside the second rounded part 27 to the fourth rounded part 29 are omitted as appropriate.

In the present embodiment, the inner voids 92 include a first inner void 92a, a second inner void 92b, a third inner void 92c, and a fourth inner void 92d as illustrated in FIG. 4. The first inner void 92a to the fourth inner void 92d are some examples of the inner voids of the present invention. The first inner void 92a is a gap formed between the positive electrode sheet 50 and the first separator 71 positioned inside the first rounded part 26. The second inner void 92b is a gap formed between the first separator 71 and the negative electrode sheet 60 positioned inside the first rounded part 26. The third inner void 92c is a gap formed between the negative electrode sheet 60 and the second separator 72 positioned inside the first rounded part 26. The fourth inner void 92d is a gap formed between the second separator 72 and the positive electrode sheet 50 positioned inside the first rounded part 26. In the present embodiment, the first inner void 92a, the second inner void 92b, the third inner void 92c, and the fourth inner void 92d as described above are formed each inside the second rounded part 27, the third rounded part 28, and the fourth rounded part 29, although specific illustration thereof is omitted.

In the present embodiment, the sizes of the first inner void 92a to the fourth inner void 92d are the same in size. The expression "the same" herein shall include some error. The first inner void 92a to the fourth inner void 92d are the same in volume. However, any one of the inner voids of the first inner void 92a to the fourth inner void 92d may differ in size from another inner void.

In the present embodiment, the first exterior void 91a to the fourth exterior void 91d (see FIG. 3) are each larger than the first inner void 92a, the second inner void 92b, the third inner void 92c, and the fourth inner void 92d. In other words, each volume of the first exterior void 91a to the fourth exterior void 91d is larger than the volume of any of the first inner void 92a to the fourth inner void 92d. For example, each volume of the first exterior void 91a to the fourth exterior void 91d is 1.01 times to 1.1 times the volume of any of the first inner void 92a to the fourth inner void 92d. However, each volume of the first exterior void 91a to the fourth exterior void 91d may be equal to or larger than 1.1 times the volume of any of the first inner void 92a to the fourth inner void 92d.

In the present embodiment, the non-aqueous electrolyte 10 penetrates the exterior voids 91 and the inner voids 92. The exterior voids 91 and the inner voids 92 are collectively and simply called "voids 95". In this embodiment, in a state where the wound electrode body 20 is housed in the battery case 30, the ratio of the voids 95 in the battery case 30 is 5% to 20%, preferably 5% to 15%, and more preferably 5% to 10%.

As stated above, a constitution of the secondary battery 100 according to the present embodiment is described. Next, a method for manufacturing the secondary battery 100 according to the present embodiment is described along the flow chart in FIG. 5 using the figures in FIGS. 6 to 9. Note that FIGS. 6 to 9 only show the shapes of the outlines of the wound electrode bodies 20 and 20A. The method for manufacturing a secondary battery 100 includes a winding step S1, an arranging step S2, and a pressing step S3, as illustrated in FIG. 5.

Figure 5:
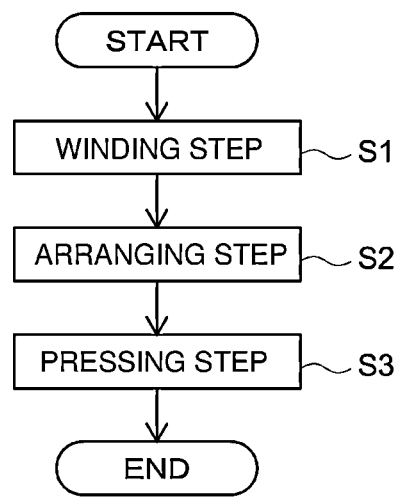
FIG. 5 is a flow chart illustrating a method for manufacturing the secondary battery according to the embodiment.
Figure 6:
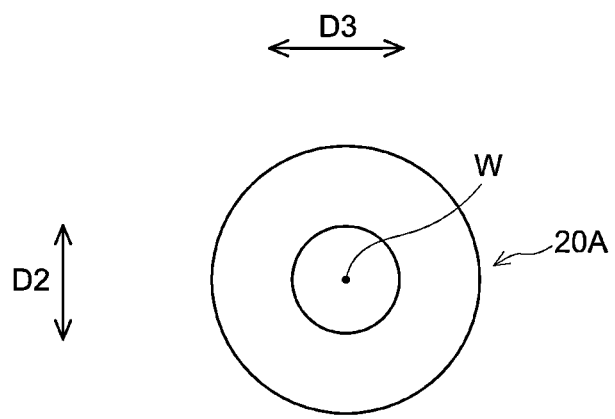
FIG. 6 is a schematic view illustrating the wound electrode body wound in a winding step.
Figure 9:
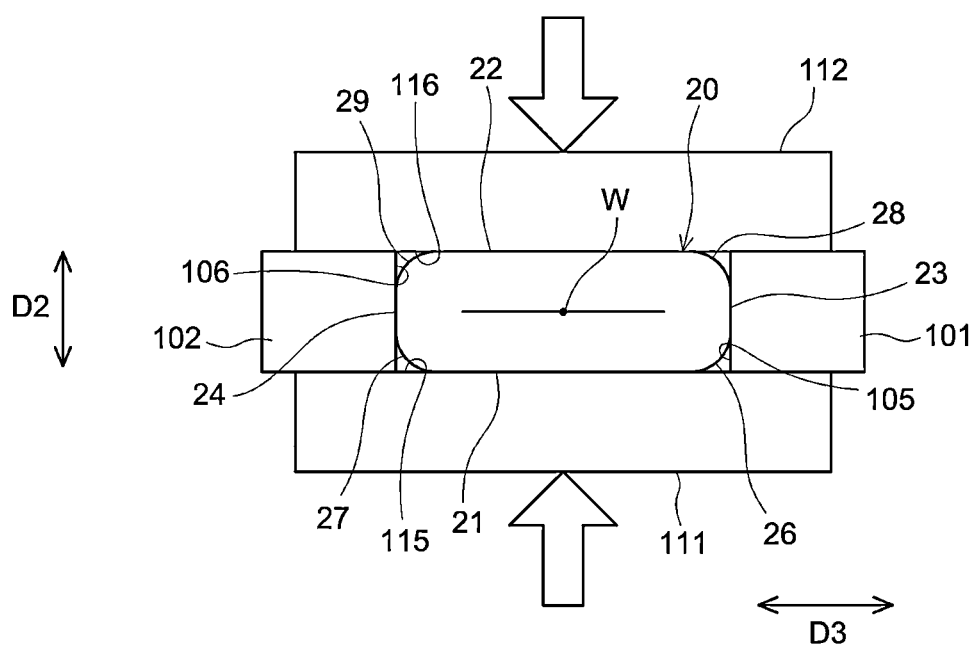
FIG. 9 is a schematic view illustrating a state after the wound electrode body is pressed in the pressing step.

First, in the winding step S1 in FIG. 5, a columnar wound electrode body 20A as disclosed in FIG. 6 is prepared. In the winding step S1, as illustrated in FIG. 2, a positive electrode sheet 50, a negative electrode sheet 60, and a separator 70 are superimposed and wound around a winding axis W extending in the first direction D1, to prepare a wound electrode body 20A (see FIG. 6). In this step, the positive electrode sheet 50, a first separator 71, the negative electrode sheet 60, and a second separator 72 are superimposed in this order. Then, the positive electrode sheet 50, the first separator 71, the negative electrode sheet 60, and the second separator 72 are wound around the winding axis W in the superimposed state. Due to this step, the columnar wound electrode body 20A which is not yet flattened as disclosed in FIG. 6 is prepared. In the present embodiment, the wound electrode body 20 having the first flat surface 21 to the fourth flat surface 24 as illustrated in FIG. 9 by pressing the columnar wound electrode body 20A.

Figure 7:
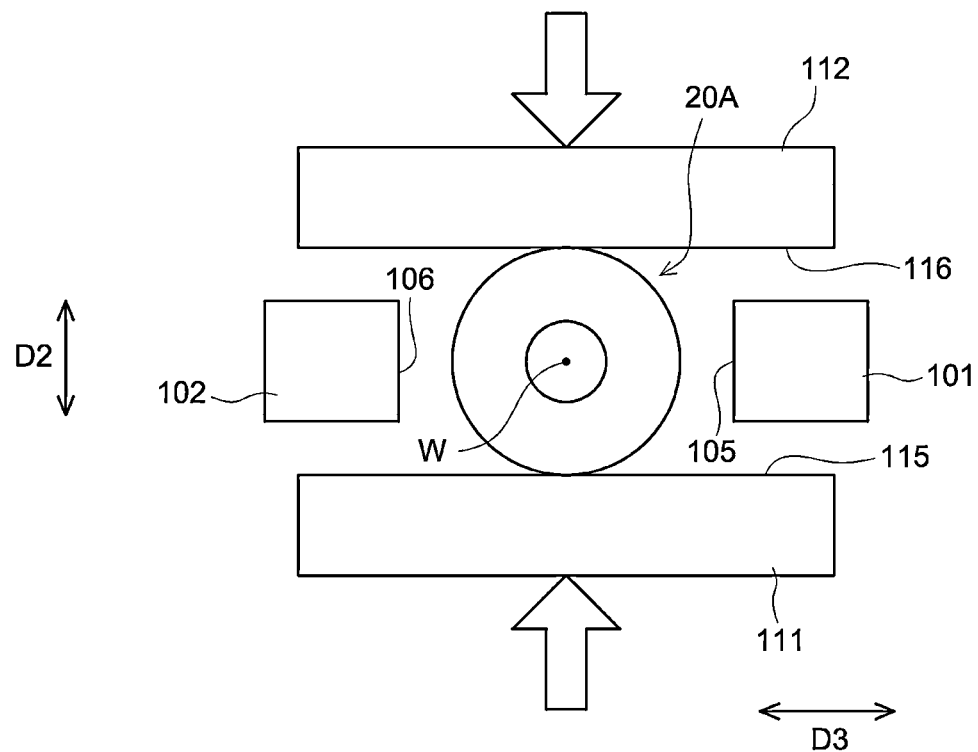
FIG. 7 is a schematic view illustrating a state before pressing the wound electrode body in a pressing step.

As illustrated in FIG. 5, the winding step S1 is followed by the arranging step S2. In the arranging step S2, the wound electrode body 20A, which was wound in the winding step S1, a first position fixed body 101, and a second position fixed body 102 are arranged as illustrated in FIG. 7. The first position fixed body 101 and the second position fixed body 102 define the length of the wound electrode body 20 in the third direction D3 as illustrated in FIG. 3. The positions of the first position fixed body 101 and the second position fixed body 102 are fixed.

In the present embodiment, as illustrated in FIG. 7, the first position fixed body 101 has a first fixed surface 105, which is contactable with the wound electrode body 20A. The first fixed surface 105 is a surface spread in the first direction D1 (in other words, a direction in which the winding axis W extends) and the second direction D2. A third flat surface 23 is formed on an outer peripheral surface of the wound electrode body 20 as illustrated in FIG. 9 by pressing the wound electrode body 20A against the first fixed surface 105.

As illustrated in FIG. 7, the second position fixed body 102 has a second fixed surface 106, which is contactable with the wound electrode body 20A. The second fixed surface 106 is a surface spread in the first direction D1 and the second direction D2 as with the first fixed surface 105. A fourth flat surface 24 is formed on an outer peripheral surface of the wound electrode body 20 as illustrated in FIG. 9 by pressing the wound electrode body 20A against the second fixed surface 106.

In the arranging step S2 in FIG. 5, the first position fixed body 101 and the second position fixed body 102 are arranged with the wound electrode body 20A, which was wound in the winding step S1, interposed therebetween as illustrated in FIG. 7. In this step, the first position fixed body 101, the wound electrode body 20A, and the second position fixed body 102 are arranged in this order along the third direction D3. At this time, the first fixed surface 105 and the second fixed surface 106 face each other with the wound electrode body 20A interposed therebetween. In other words, the first fixed surface 105 and the second fixed surface 106 each face the wound electrode body 20A. In this step, the first position fixed body 101 is arranged so that the first fixed surface 105 faces the wound electrode body 20A side. The second position fixed body 102 is arranged so that the second fixed surface 106 faces the wound electrode body 20A side. The distance from the first fixed surface 105 to the second fixed surface 106 corresponds to a length of the wound electrode body 20 in the third direction D3 as illustrated in FIG. 3, in other words, a length in the third direction D3 from the third flat surface 23 to the fourth flat surface 24. As stated above, in the arranging step S2 in FIG. 5, the first position fixed body 101, the wound electrode body 20A, and the second position fixed body 102 are arranged as illustrated in FIG. 7.

Figure 8:
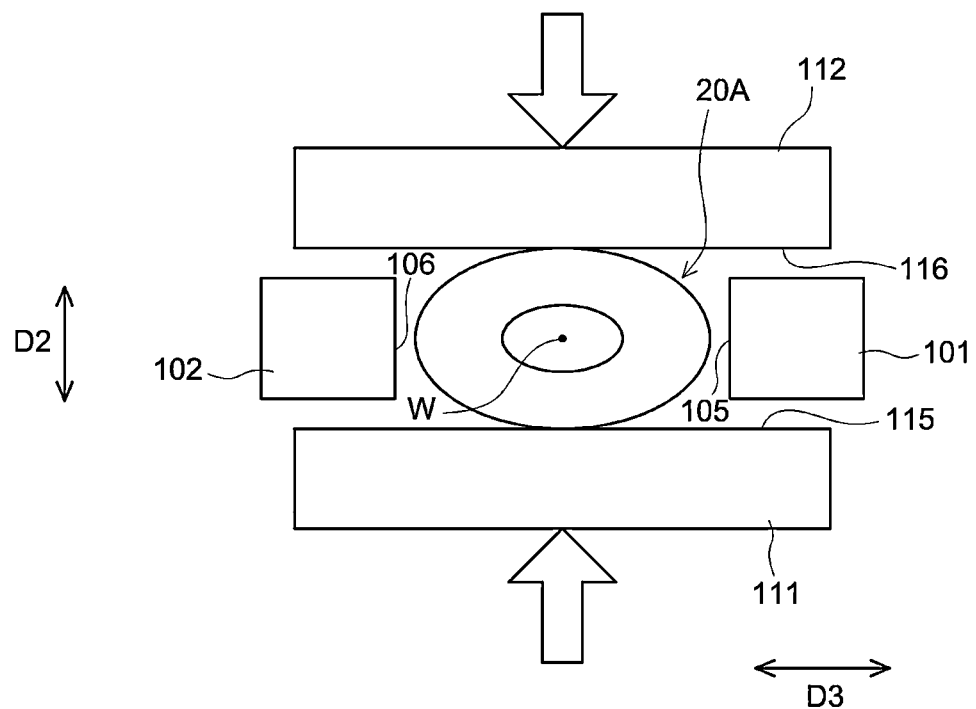
FIG. 8 is a schematic view illustrating a state during pressing the wound electrode body in the pressing step.

As illustrated in FIG. 5, the winding step S1 and the arranging step S2 are followed by the pressing step S3. In the pressing step S3, as illustrated in FIGS. 7, 8, and 9, the columnar wound electrode body 20A, which was wound in the winding step S1, is pressed in the second direction D2 and also pressed in the third direction D3 to flatten the wound electrode body 20A, whereby a flattened wound electrode body 20 (see FIG. 9) is prepared. In the present embodiment, pressing the wound electrode body 20A in the third direction D3 is performed by the first position fixed body 101 and the second position fixed body 102.

As illustrated in FIG. 7, pressing the wound electrode body 20A in the second direction D2 is performed by a first pressing body 111 and a second pressing body 112. The first pressing body 111 presses the wound electrode body 20A from one end side in the second direction D2. The first pressing body 111 has a first pressing surface 115. The first pressing surface 115 is a surface that directly presses the wound electrode body 20A and is contactable with the wound electrode body 20A. The first pressing surface 115 is a surface spread in the first direction D1 and the third direction D3.

The second pressing body 112 presses the wound electrode body 20A from the other end side in the second direction D2. The second pressing body 112 has a second pressing surface 116. The second pressing surface 116 is a surface that directly presses the wound electrode body 20A and is contactable with the wound electrode body 20A as with the first pressing surface 115. The second pressing surface 116 is a surface spread in the first direction D1 and the third direction D3.

In the pressing step S3 of FIG. 5, as illustrated in FIG. 7, the first pressing body 111 is placed on one end side in the second direction D2 of the wound electrode body 20A and the second pressing body 112 is placed on the other end side of in the second direction D2 of the wound electrode body 20A. At this time, the first pressing surface 115 and the second pressing surface 116 both face the wound electrode body 20A side.

In the pressing step S3, the wound electrode body 20A is pressed by the first pressing body 111 and the second pressing body 112 from the second direction D2 in the arrow direction illustrated in FIG. 7. In this step, the term "press(ing)" refers to applying a pressure on the wound electrode body 20A while changing the relative positions of the first pressing body 111 and the second pressing body 112 in the second direction D2. By the pressing by the first pressing body 111, the first pressing surface 115 is brought into contact with the wound electrode body 20A and the wound electrode body 20A is pressed thereafter as illustrated in FIG. 8. By this pressing, the first flat surface 21 (see FIG. 9) is formed on an outer peripheral surface pressed by the first pressing surface 115 in the wound electrode body 20A. Similarly, in the pressing by the second pressing body 112, the second pressing surface 116 is brought into contact with the wound electrode body 20A and the wound electrode body 20A is pressed thereafter as illustrated in FIG. 8. By this pressing, the second flat surface 22 (see FIG. 9) is formed on an outer peripheral surface pressed by the second pressing surface 116 in the wound electrode body 20A.

In the pressing step S3 of FIG. 5, the positions of the first position fixed body 101 and the second position fixed body 102 are fixed without moving during a period when the wound electrode body 20A is being pressed in the second direction D2. In the pressing step S3, the wound electrode body 20A is pressed in the second direction D2 until the wound electrode body 20A is pressed against the first fixed surface 105 of the first position fixed body 101 and the second fixed surface 106 of the second position fixed body 102. By increasing the pressing pressure applied onto the wound electrode body 20A, the wound electrode body 20A spreads in the third direction D3. Thereafter, the first fixed surface 105 and the second fixed surface 106 are brought into contact with the wound electrode body 20A and press the wound electrode body 20A. Then, the third flat surface 23 (see FIG. 9) is formed on an outer peripheral surface pressed by the first fixed surface 105 in the wound electrode body 20A. Similarly, the fourth flat surface 24 (see FIG. 9) is formed on an outer peripheral surface pressed by the second fixed surface 106 in the wound electrode body 20A.

In the present embodiment, the wound electrode body 20 can be manufactured by performing the pressing step S3. Although the illustration is omitted, the secondary battery 100 can be manufactured by the step of preparing the wound electrode body 20, housing the wound electrode body 20 in the battery case 30, and injecting the non-aqueous electrolyte 10 into the battery case 30.

As described above, in the present embodiment, the wound electrode body 20A is pressed in the second direction D2 and also pressed in the third direction D3 to flatten the wound electrode body 20A, as illustrated in FIGS. 7 to 9, in the pressing step S3 of FIG. 5. As a result, the first flat surface 21 and the second flat surface 22 facing each other with the winding axis W interposed therebetween and the third flat surface 23 and the fourth flat surface 24 disposed between the first flat surface 21 and the second flat surface 22 and facing each other with the winding axis W interposed therebetween are formed on the outer peripheral surfaces of the wound electrode body 20.

In the present embodiment, in the pressing step S3 after the arranging step S2, the wound electrode body 20A is pressed in the second direction D2 until the wound electrode body 20A is pressed against the first fixed surface 105 and the second fixed surface 106. By this step, the wound electrode body 20A can be pressed not only in the second direction D2 but also in the third direction D3 simultaneously. Thus, the first flat surface 21 to the fourth flat surface 24 can be easily formed in the wound electrode body 20 by the motion for pressing in the second direction D2.

In the present embodiment, as illustrated in FIG. 3, the wound electrode body 20 includes the elongated positive electrode sheet 50, the elongated negative electrode sheet 60, and the separator 70 interposed between the positive electrode sheet 50 and the negative electrode sheet 60, which are superimposed and wound around the winding axis W. The wound electrode body 20 has the first flat surface 21, the second flat surface 22, the third flat surface 23, and the fourth flat surface 24 positioned on the outer peripheral surfaces around the winding axis W. The first flat surface 21 and the second flat surface 22 face each other with the winding axis W interposed therebetween. The third flat surface 23 and the fourth flat surface 24 are disposed between the first flat surface 21 and the second flat surface 22 and face each other with the winding axis W interposed therebetween. Due to this feature, the first flat surface 21 to the fourth flat surface 24 are arranged along the inner peripheral surfaces of the rectangular battery case 30 and, as a result, dead spaces between the battery case 30 and the wound electrode body 20 can be made smaller than conventional batteries. Thus, the volume efficiency of the wound electrode body 20 can be enhanced.

In the present embodiment, the wound electrode body 20 has the first rounded part 26 to the fourth rounded part 29. Thus, by forming the first flat surface 21 to the fourth flat surface 24 and the first rounded part 26 to the fourth rounded part 29 in the wound electrode body 20, radii of curvature of the rounded parts 26 to 29 can be made smaller as compared with conventional electrode body. Thus, dead spaces between the battery case 30 and the wound electrode body 20 can be made smaller than conventional batteries and the volume efficiency of the wound electrode body 20 can be enhanced.

In the present embodiment, the inner voids 92 as illustrated in FIG. 4 are formed at gaps in a portion where the positive electrode sheet 50, the negative electrode sheet 60, and the separator 70 are superimposed inside at least one of the first rounded part 26 to the fourth rounded part 29 (inside all of the first rounded part 26 to the fourth rounded part 29 in this embodiment). Specifically, the inner voids 92 are formed between the positive electrode sheet 50 and the first separator 71, between the first separator 71 and the negative electrode sheet 60, the negative electrode sheet 60 and the second separator 72, and between the second separator 72 and the positive electrode sheet 50 inside at least one of the first rounded part 26 to the fourth rounded part 29 (inside all of the first rounded part 26 to the fourth rounded part 29 in this embodiment). By this feature, the non-aqueous electrolyte 10 can penetrate the inner voids 92 formed inside the first rounded part 26 to the fourth rounded part 29.

In the present embodiment, as illustrated in FIG. 4, the exterior void 91 (the first exterior void 91a in this embodiment) is formed, for example, between the first rounded part 26 and an inner peripheral surface of the battery case 30. The first exterior void 91a is larger than one inner void 92 (for example, the first inner voids 92a) formed inside the first rounded part 26. For example, when the inner void 92 becomes relatively large, the wound electrode body 20 also becomes relatively large. The wound electrode body 20 is preferably as small as possible. Thus, in the present embodiment, each inner void 92 is made smaller than, for example, the first exterior void 91a, whereby each inner void 92 becomes relatively small and therefore, the wound electrode body 20 can be relatively small.

In the present embodiment, at least one of the first flat surface 21 to the fourth flat surface 24 (the first flat surface 21 to the third flat surface 23 in this embodiment) is in contact with the inner peripheral surfaces of the battery case 30 via a so-called insulating film, as illustrated in FIG. 3. Due to this feature, gaps between the first flat surface 21 to the fourth flat surface 24 and the inner peripheral surfaces of the battery case 30 can be made small. Thus, dead spaces between the battery case 30 and the wound electrode body 20 can be made smaller.

In the present embodiment, the first case flat surface 81 of the battery case 30 faces the first flat surface 21 along the first flat surface 21. The second case flat surface 82 faces the second flat surface 22 along the second flat surface 22. The third case flat surface 83 faces the third flat surface 23 along the third flat surface 23. The fourth case flat surface 84 faces the fourth flat surface 24 along the fourth flat surface 24. Due to this feature, dead spaces between the battery case 30 and the wound electrode body 20 can be made smaller by housing the wound electrode body 20 in the battery case 30 so that the first flat surface 21 to the fourth flat surface 24 are arranged along the first case flat surface 81 to the fourth case flat surface 84, respectively.

In the present embodiment, the wound electrode body 20 includes the first rounded part 26 to the fourth rounded part 29, but the first rounded part 26 to the fourth rounded part 29 may be omitted. In this case, the shape of the wound electrode body 20 is rectangular when seen from the first direction D1. In this case, the upper end of the first flat surface 21 is connected to the left end of the fourth flat surface 24 and the lower end of the first flat surface 21 is connected to the left end of the third flat surface 23. The upper end of the second flat surface 22 is connected to the right end of the fourth flat surface 24 and the lower end of the second flat surface 22 is connected to the right end of the third flat surface 23.

In the above embodiment, one wound electrode body 20 is housed in one battery case 30. However, the number of the wound electrode bodies 20 housed in one battery case 30 is not limited to one, and may be two or more, namely, plural. When a plurality of wound electrode bodies 20 are housed in the battery case 30, the wound electrode bodies 20 may be housed in the battery case 30 so that, for example, the plurality of wound electrode bodies 20 align in the second direction D2, in other words, wide surfaces of wound electrode bodies 20 (the first flat surface 21 and the second flat surface 22 in this case) are arranged mutually superimposedly. Even in this case, dead spaces between the battery case 30 and each of the wound electrode bodies 20 can be small by arranging the first flat surface 21 to the fourth flat surface 24 of each of the wound electrode bodies 20 along the inner peripheral surfaces of the rectangular battery case 30. Thus, the volume efficiency of the wound electrode body 20 can be enhanced even when a plurality of the wound electrode bodies 20 are housed in the battery case 30.

What is claimed is:

1. A method for manufacturing a secondary battery, comprising, when mutually intersecting three directions are assumed to be a first direction, a second direction, and a third direction, respectively,
   a winding step of superimposing a positive electrode sheet, a negative electrode sheet, and a separator and winding the positive electrode sheet, the negative electrode sheet, and the separator around a winding axis extending in the first direction, to prepare a wound electrode body, and
   a pressing step of pressing the wound electrode body in the second direction and also in the third direction to flatten the wound electrode body, to thereby form a first flat surface and a second flat surface facing each other with the winding axis interposed therebetween, and a third flat surface and a fourth flat surface disposed between the first flat surface and the second flat surface and facing each other with the winding axis interposed therebetween, on outer peripheral surfaces of the wound electrode body.

2. The method for manufacturing a secondary battery according to claim 1, further comprising, after the winding step:
   an arranging step of arranging a first position fixed body having a first fixed surface that is contactable with the wound electrode body, a second position fixed body having a second fixed surface that is contactable with the wound electrode body, and the wound electrode body along the third direction in a state where the first position fixed body and the second position fixed body are arranged such that the first fixed surface and the second fixed surface face each other with the wound electrode body interposed therebetween, wherein,
   in the pressing step, after the arranging step, the wound electrode body is pressed in the second direction until the wound electrode body is pressed against the first fixed surface and the second fixed surface.

* * * * *